(12) United States Patent
Park et al.

(10) Patent No.: US 8,968,447 B2
(45) Date of Patent: Mar. 3, 2015

(54) SEPARATION MEMBRANE, METHOD OF MANUFACTURE THEREOF, AND APPARATUS INCLUDING THE SEPARATION MEMBRANE

(71) Applicant: Samsung Electronics Co., Ltd., Suwon-si, Gyeonggi-do (KR)

(72) Inventors: Hyeon Cheol Park, Hwaseong-si (KR); Kwang Hee Kim, Seoul (KR); Byung Ki Ryu, Hwaseong-si (KR); Jae Ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 82 days.

(21) Appl. No.: 13/685,132

(22) Filed: Nov. 26, 2012

(65) Prior Publication Data

US 2013/0136666 A1 May 30, 2013

(30) Foreign Application Priority Data

Nov. 24, 2011 (KR) .................. 10-2011-0123684
Jul. 27, 2012 (KR) .................. 10-2012-0082261

(51) Int. Cl.
| | |
|---|---|
| *B01D 53/22* | (2006.01) |
| *B01D 71/02* | (2006.01) |
| *B01J 8/02* | (2006.01) |
| *C01B 3/50* | (2006.01) |

(52) U.S. Cl.
CPC ............. *B01D 71/022* (2013.01); *B01J 8/02* (2013.01); *B01D 53/228* (2013.01); *C01B 3/503* (2013.01); *C01B 3/505* (2013.01)
USPC .............. 96/4; 96/10; 96/11; 95/56; 422/187

(58) Field of Classification Search
USPC .............. 96/4, 10, 11; 95/45, 55, 56; 422/187
See application file for complete search history.

(56) References Cited

U.S. PATENT DOCUMENTS

| | | | |
|---|---|---|---|
| 3,350,846 A | 11/1967 | Makrides et al. | |
| 6,585,033 B2 | 7/2003 | Nishida et al. | |
| 2004/0129135 A1 | 7/2004 | Roark et al. | |
| 2007/0240566 A1* | 10/2007 | Benn et al. ................... | 95/56 |
| 2008/0174040 A1* | 7/2008 | Saukaitis et al. ............. | 95/56 |
| 2010/0247944 A1 | 9/2010 | Mleczko et al. | |
| 2011/0038101 A1* | 2/2011 | Caumont et al. ............. | 361/502 |
| 2011/0229379 A1 | 9/2011 | Way et al. | |

FOREIGN PATENT DOCUMENTS

| | | |
|---|---|---|
| JP | 2003001381 A | 1/2003 |
| JP | 2006095521 A | 4/2006 |
| WO | 2007078278 A2 | 7/2007 |

OTHER PUBLICATIONS

Dolan, M.D., "Non-Pd BCC Alloy Membranes for Industrial Hydrogen Separation", Journal of Membrane Science, vol. 362, 2010, pp. 12-28.*
Dolan, M.D., "Non-Pd BCC alloy membranes for industrial hydrogen separation," Journal of Membrane Science, vol. 362, 2010, pp. 12-28.
Dolan, "Non-Pd BCC alloy membranes for industrial hydrogen separation", Journal of Membrane Science, 362, 2010, pp. 12-28.
Extended European Search Report for European Patent Application No. 12194081.1 dated Mar. 25, 2013.

* cited by examiner

*Primary Examiner* — Jason M Greene
(74) *Attorney, Agent, or Firm* — Cantor Colburn LLP

(57) ABSTRACT

A separation membrane including an alloy including a Group 5 element and Ir, wherein the alloy includes a body centered cubic crystal structure.

18 Claims, 17 Drawing Sheets

SEPARATION MEMBRANE, METHOD OF MANUFACTURE THEREOF, AND APPARATUS INCLUDING THE SEPARATION MEMBRANE

This application claims priority to Korean Patent Application No. 10-2011-0123684 filed on Nov. 24, 2011, and Korean Patent Application No. 10-2012-0082261, filed on Jul. 27, 2012, and all the benefits occurring therefrom under 35 U.S.C. §119, the contents of which in their entirety are incorporated herein by reference.

BACKGROUND

1. Field

A separation membrane, a method of manufacture thereof, and an apparatus including the separation membrane are disclosed.

2. Description of the Related Art

Pd-based metals are used for membranes for selectively separating hydrogen gas from a gas mixture containing hydrogen gas. The Pd-based metals form a structure having a face-centered cubic (FCC) lattice. Hydrogen can be selectively separated by hydrogen dissolution and diffusion into the interstitial sites of the FCC lattice of Pd. However, the high unit cost and the low permeability of available Pd-based metals limits their commercialization.

Accordingly, there is a demand for a hydrogen separation membrane having excellent hydrogen permeability, e.g., a hydrogen permeability similar to or higher than that of a Pd-based metal membrane, and having a lower cost.

A porous separation membrane and an amorphous separation membrane have been developed.

In a porous separation membrane, gases are separated depending on the size of the pores. However, gas selectivity of the porous membranes, for example, hydrogen gas permeability/$CO_2$ permeability, is low, since it is substantially difficult to manufacture a membrane having pores of the same size or of a perfectly spherical shape.

As for the amorphous metal separation membranes, the process or composition for manufacturing the membranes is limited to those which can be quenched because the membranes are manufactured by quenching molten metal. Since the membranes are used at a high temperature, i.e., between 250° C. and 500° C., amorphous membranes may also suffer from insufficient durability due to crystallization of the metal at a high temperature.

Thus there remains a need for an improved hydrogen separation membrane.

SUMMARY

An embodiment provides a separation membrane that has excellent hydrogen permeability, reduced hydrogen embrittlement, and improved oxidation stability.

Yet another embodiment provides an apparatus including said separation membrane.

According to an embodiment, provided is a separation membrane including an alloy including Group 5 element and Ir (Iridium), wherein the alloy includes a body centered cubic crystal structure.

In the separation membrane, the Group 5 element may be V, Nb, Ta or a combination thereof.

The alloy may be in the form of a non-porous layer.

The non-porous layer may have a porosity of less than about 10 volume percent (volume %), based on a total volume of the non-porous layer.

The non-porous layer may have a porosity of less than about 5 volume %, based on a total volume of the non-porous layer.

The non-porous layer may have a porosity of less than about 1 volume %, based on a total volume of the non-porous layer.

The Ir may be contained in the alloy in an amount of about 0.1 to about 40 atomic percent (atom %), based on a total content of the alloy.

In the separation membrane, the alloy may have a body-centered cubic (bcc) crystal structure.

In the separation membrane, the alloy may further include an additional metal including Zr, Cu, Y, Ni, Al, Mn, or a combination thereof.

The alloy that further includes the additional metal may be crystalline.

In the alloy that further includes the additional metal, Ir may be contained in an amount of about 0.1 to about 40 atom %, and the additional metal may be contained in an amount of about 0.1 to about 30 atom %, each based on a total content of the alloy.

The separation membrane may have a thickness of about 1 to about 500 micrometers (μm).

According to an embodiment, disclosed is a hydrogen separation membrane including the separation membrane, and a catalyst layer on the separation membrane.

The separation membrane may have hydrogen solubility (H/M) of about 0.01 to about 0.6, when measured under a hydrogen pressure of about 0.1 to about 1 megaPascal (MPa) and at a temperature of about 400° C.

The hydrogen separation membrane may have a hydrogen solubility (H/M) of about 0.1 to about 0.4, when measured under a hydrogen pressure of about 0.7 MPa (corresponding to about 7 bar) and at a temperature of about 400° C.

The hydrogen separation membrane may have hydrogen permeability of about $1.0 \times 10^{-8}$ to about $15.0 \times 10^{-8}$ moles per meters-seconds-Pascals$^{1/2}$ (mol/m*s*Pa$^{1/2}$) at a temperature of about 400° C.

The separation membrane may further include a catalyst layer on the alloy.

The catalyst layer may include Pd, Pt, Ru, Ir, Cu, Ag, Au, Rh, or a combination thereof.

According to yet another embodiment, an apparatus including the separation membrane is provided.

According to yet another embodiment, an apparatus including the hydrogen separation membrane is provided.

The apparatus may further include:

a chamber including an inlet for introducing a hydrogen-containing gas into the chamber, and an outlet for discharging separated hydrogen gas from the chamber;

wherein the hydrogen separation membrane separates the chamber into a first part including the inlet for introducing hydrogen-containing gas, and a second part including the outlet for discharging the separated hydrogen gas.

The hydrogen separation membrane may have a tubular shape. A cylindrical chamber wall with a diameter larger than the diameter of the tubular hydrogen separation membrane may contain the hydrogen separation membrane. A space between the chamber wall and the hydrogen separation membrane may be the first part of the chamber, and the inside of the tubular hydrogen separation membrane may be the second part of the chamber for discharging hydrogen.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1A:
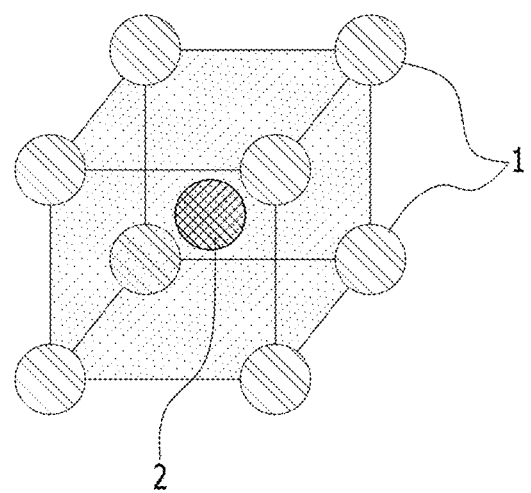
FIGS. 1A and 1B are schematic views of an embodiment of a crystal lattice structure of an alloy of a separation membrane.

This disclosure will be described more fully hereinafter in the following detailed description, in which some but not all embodiments of this disclosure are described. This disclosure may be embodied in many different forms and should not be construed as limited to the embodiments set forth herein; rather, these embodiments are provided so that this disclosure will full and complete, and will fully convey the scope of the invention to those skilled in the art. Like reference numerals refer to like elements throughout.

As those skilled in the art would realize, the described embodiments may be modified in various different ways, all without departing from the spirit or scope of this disclosure. The size and thickness of each constituent element as shown in the drawings is schematically indicated for better understanding and ease of description, and this disclosure shall not be limited to the embodiment shown.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, provided is a separation membrane comprising an alloy comprising a Group 5 element and Iridium (Ir), wherein the alloy comprises a body centered cubic crystal structure.

The separation membrane may be used as a separation membrane for selectively separating a specific gas.

As for a separation membrane including a Group 4 or a Group 5 metal element, embrittlement fracture may occur, resulting in low hydrogen durability due to high hydrogen solubility. Metal-based separation membranes may also deteriorate in performance when used at a temperature at which the metals are oxidized. Accordingly, there remains a need to overcome hydrogen embrittlement fracture by inhibiting the formation of metal hydrides due to hydrogen solubility, while providing a gas permeability which is suitable for hydrogen separation in membranes including a Group 4 or a Group 5 metal element.

The separation membrane according to the disclosed embodiment may be suitable for use at a high temperature, as compared to a separation membrane consisting of a polymer. Further, the disclosed separation membrane has relatively low hydrogen solubility, which inhibits hydrogen embrittlement fracture, and provides high hydrogen permeability, even though the membrane includes a Group 5 metal element. The separation membrane is also resistant to problems such as deteriorated performance due to the crystallization of amorphous metals, which is a problem for amorphous metal separation membranes, since the disclosed separation membrane comprises a crystalline alloy.

According to the embodiment, the alloy comprises a Group 5 metal element and Ir, which form a crystalline structure, wherein "Group" refers to a group of the Periodic Table of the Elements.

The crystal structure of the alloy may comprise a body-centered cubic (BCC) structure, a face-centered cubic (FCC) structure, a hexagonal closed packed (HCP) structure, or a combination thereof. A BCC structure is specifically mentioned.

It is known that a Group 5 metal may form a BCC crystal structure, which may be confirmed by X-ray diffraction (XRD) analysis of peaks that correspond to the crystal surfaces of the structure.

Figure 4:
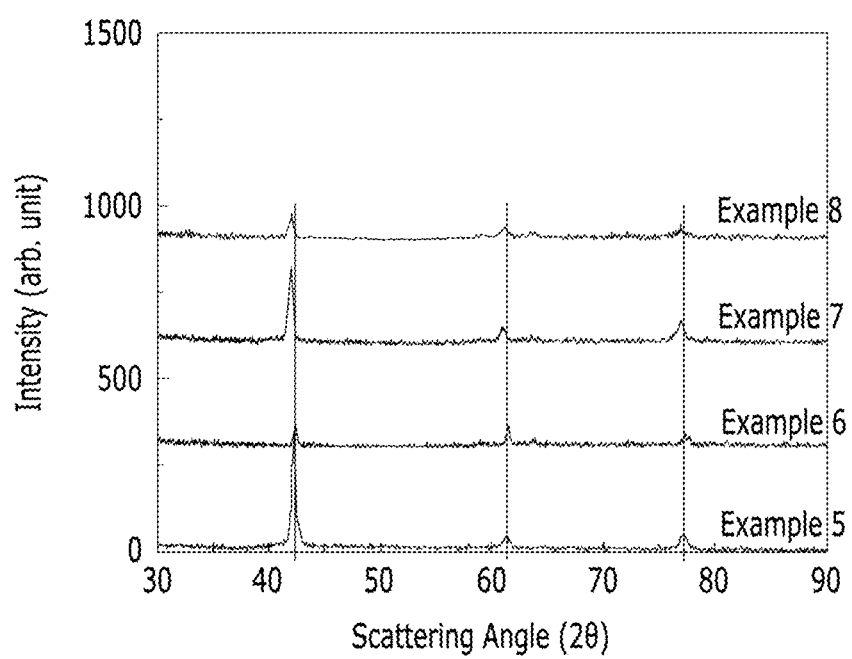
FIG. 4 is a graph of intensity (arbitrary units) versus scattering angle (degrees two-theta, $2\theta$) which shows the results of X-ray diffraction (XRD) analysis of the hydrogen separation membranes manufactured in Example 5, Example 6, Example 7, and Example 8.

The alloy according to an embodiment comprises a Group 5 metal and Ir, which together form a crystalline structure, which may comprise a body-centered cubic (BCC) structure, even though the alloy comprises a Group 5 metal and Ir (see FIG. 4). The alloy may further comprise a phase having a FCC or a HCP structure, or a combination thereof.

When the alloy comprises less than or equal to about 10 atomic percent (atom %) Ir, the alloy may form a crystalline structure, most of which has a BCC structure.

As the amount of Ir increases, the alloy may also comprise a phase having a FCC structure, an HCP structure, or a combination thereof.

Accordingly, the alloy in the separation membrane according to an embodiment may comprise a crystalline structure, wherein more than or equal to about 50 volume percent (volume %), specifically about 70 volume %, more specifically about 80 volume %, or about 50 to about 99 volume %, or about 60 to about 98 volume % has a BCC structure, based on a total volume of the alloy.

According to an embodiment, a hydrogen separation membrane comprises the separation membrane.

The hydrogen separation membrane is effective to selectively separate hydrogen gas from a gas mixture containing hydrogen gas, and it has high hydrogen permeability. While not wanting to be bound by theory, it is understood that by including a BCC crystal structure, hydrogen diffusion is facilitated. As a result, the hydrogen separation membrane may separate hydrogen with high purity. For example, the alloy may have a content of the BCC crystal structure in the hydrogen separation membrane of equal to or more than about 50 volume %, specifically about 70 volume %, more specifically about 80 volume %, or about 50 to about 99 volume %, or about 60 to about 98 volume %, based on a total volume of the separation membrane. The separation membrane having a crystal structure in the above range may be used as a hydrogen separation membrane.

Figure 1B:
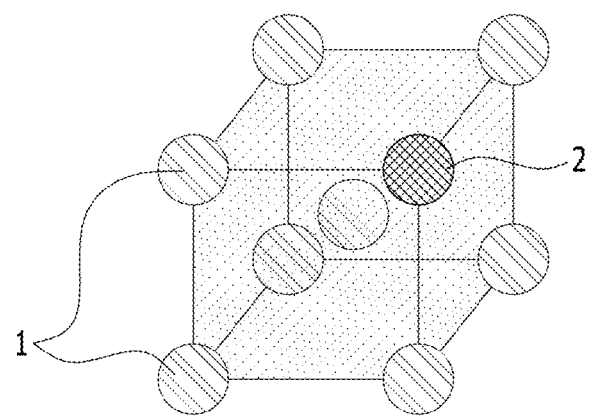

FIGS. 1A and 1B are schematic views of types of a crystal structure that may be included in the separation membrane, and show a crystal structure that may be formed by an alloy comprising a Group 5 element 1 and Iridium (Ir)$_2$. The Group 5 element forms a body-centered cubic structure, and FIG. 1A shows an embodiment wherein the Ir is substituted in the body center of the body-centered cubic structure formed by the Group 5 element to provide a substitutional alloy. FIG. 1B shows an embodiment wherein the Ir element is substituted in the corner of the body-centered-cubic structure formed by the Group 5 element, also providing a substitutional alloy. In another embodiment, the Ir may substitute at a combination of the body center and corner sites. Thus, in an embodiment the separation membrane has a BCC crystal structure formed by the Group 5 element and Ir.

The alloy may be in the form of a non-porous layer with a porosity of less than about 10 volume %, specifically less than about 5 volume %, more specifically less than about 1 volume %, or a porosity of about 0.01 to about 10 volume %, or about 0.1 to about 5 volume %, based on a total volume of the non-porous layer. Also, the separation membrane may be comprise the non-porous layer and have a porosity of less than about 10 volume %, specifically less than about 5 volume %, more specifically less than about 1 volume %, or a porosity of about 0.01 to about 10 volume %, or about 0.1 to about 5 volume %, based on a total volume of the separation membrane.

In this context, the term "non-porous" means that substantially no pores which extend in a direction of a thickness of a layer are present such that a molecule of a gas, for example, hydrogen (H2), oxygen (O2), carbon dioxide (CO2), or nitrogen (N2), could pass therethrough, reducing the selectivity of the separation membrane.

Porosity, or void fraction, is defined according to Equation 1:

$$\text{Porosity}(\%) = [\text{void volume/total volume}] \times 100\% \quad \text{Equation 1}$$

That is, porosity or void fraction is a measure of the void (i.e. "empty") spaces in a material, and is a fraction of the volume of voids over the total volume, and can be expressed as ratio between 0~1, or as a percentage between 0~100%.

Since the alloy may be formed as a non-porous layer, the separation membrane comprising the alloy may selectively permeate and separate only a material to be separated, e.g., hydrogen gas. If the separation membrane is applied as a hydrogen separation membrane, it may comprise a non-porous layer to allow hydrogen to selectively permeate, thus to separating only hydrogen.

The separation membrane may be designed according to the characteristics of a desired membrane by changing the content of the Ir in the separation membrane. Specifically, the alloy of the separation membrane may include the Ir in a content of about 0.1 to about 40 atom %, specifically about 0.1 to about 30 atom %, and more specifically about 5 to about 15 atom %, based on a total content of the alloy. The separation membrane including the alloy comprising Ir in the above content range may have excellent hydrogen permeability and simultaneously have highly improved durability, and thus may be useful for a hydrogen separation membrane.

The Group 5 element may be V, Nb, Ta, or a combination thereof. In an embodiment the Group 5 element is V and Nb. An embodiment in which the Group 5 element is Nb is specifically mentioned.

The separation membrane may consist of, for example, an alloy of Nb and Ir, an alloy of V and Ir, and an alloy of Nb, V, and Ir, or an alloy of Nb, Ta, and Ir.

The separation membrane may be an alloy further including an additional metal other than the Group 5 element and Ir. For example, the alloy may be a three-component alloy or four-component alloy. The additional metal may comprise Zr, Cu, Y, Ni, Al, Mn, or a combination thereof. If the additional metal is further included, a ductility of the separation membrane may be increased.

The additional metal may also form a BCC crystal structure together with the Group 5 element and the Ir in the alloy, e.g., forming a substitutional alloy with the Group 5 element and the Ir. Alternatively, the alloy further including the additional metal may form an intermetallic compound, a portion of the alloy may form a BCC crystal structure, and the BCC crystal structure may be present in an amount equal to or more than about 50 volume %, specifically about 70 volume %, more specifically about 80 volume %, or about 50 to about 99 volume %, or about 60 to about 98 volume %, based a total volume of the alloy, in the separation membrane comprising the alloy and further including the additional metal. In an embodiment in which the additional metal forms an intermetallic compound, the intermetallic compound may be present in the alloy. In another embodiment, the additional element is interstitially disposed, substitutionally disposed, or a combination thereof, in the alloy.

If the alloy of the separation membrane further includes the additional metal, the alloy may comprise about 0.1 to about 40 atom % of Ir and about 0.1 to about 30 atom % of an additional metal comprising Zr, Cu, Y, Ni, Al, Mn, or a combination thereof, based on a total content of the alloy.

The separation membrane consisting of only a Group 5 element may form a metal hydride, which can be embrittled when it is contacted with hydrogen, which is referred to as "hydrogen embrittlement." External stress being applied to the embrittled membrane may cause a hydrogen embrittlement fracture. To suppress the hydrogen embrittlement fracture, the hydrogen solubility may be reduced. By alloying Ir with the Group 5 element, the separation membrane may have a reduced hydrogen solubility, as compared to the membrane consisting of only a pure Group 5 element. If Ir is alloyed so as to form the crystal structures as shown in FIGS. 1A and 1B, a binding energy of hydrogen atoms with Ir and the Group 5 element may be changed to lower the hydrogen solubility. The hydrogen solubility means the concentration of hydrogen dissolved in a metal, and is calculated by the mole ratio (H/M) of moles hydrogen atoms (H) to the moles of metal atoms of the alloy (M), e.g., the Group 5 metal, Ir, and the additional metal if present.

For example, a heat of H solution in an Nb—Ir alloy including about 6 atom % of Ir is about −0.25 electron volts (eV) at a hydrogen concentration of 0.5 (i.e., the mole ratio of H/Nb is about 0.5), when calculated using density functional theory (DFT). The heat of H solution of the alloy is less than that for pure Nb, which is about −0.4 eV, when comparing the absolute values of the heat of H solution of the alloy and pure Nb. This indicates that the hydrogen solubility is reduced in the Nb—Ir alloy. Thus, the alloy of the separation membrane, which comprises the Group 5 element and Ir, provides reduced hydrogen solubility.

Specifically, calculations are carried out with the plane-wave pseudopotential method based on DFT, which are implemented in the Vienna ab initio simulation package (VASP). The generalized gradient approximation (GGA) proposed by Perdew, Burke, and Ernzerhof (Phys. Rev. Lett. 77, 3865 (1996)) is adopted for the electronic exchange correlation potential. The plane-wave cutoff energy and the Monkhorst-Pack k point sampling have been carefully tested, and finally the optimized cutoff energy of 300 eV and 6×6×6 grids for the k point mesh have been chosen in order to achieve a compromise between the accuracy of the calculation and the computational effort. The alloy structures are modeled by replacing one of the 16 Nb atoms by an alloying metal atom, resulting in a supercell consisting of 15 Nb atoms and 1 alloying metal atom. The H concentrations in the metals, c=H/(Nb+M), are varied from $1/16$ to $1/2$ in the calculations. All atomic positions and the lattice parameters are fully relaxed until the residual forces are smaller than 0.02 eV/Å and the total energy convergence within 1 meV/supercell.

The solution energy of H in a Nb based alloy is defined as $$E_{SOL}=(1/n)\{E[Nb_{15}M_1-nH]-E[Nb_{15}M_1]\}-E[H_2]/2,$$

where $E[Nb_{15}M_1-nH]$ and $E[Nb_{15}M_1]$ are the total energies of $Nb_{15}M_1$ supercells with and without n interstitial H atoms, respectively, whereas $E[H_2]$ denotes the total energy of an $H_2$ molecule in vacuum. Since H is a very light element, zero-point energy ($\Delta E_{ZPE}$) correction is very important. The vibration modes of H in metal and $H_2$ molecules are calculated using density-functional perturbation theory. The vibration frequencies for H at the tetrahedral insterstitial (denoted as $H_T$) in Nb are 1400, 1400, and 1037 cm$^{-1}$, whereas the calculated $\Delta E_{ZPE}$ for $H_T$ in Nb is 106 meV/H, after taking into consideration the vibration frequency of the $H_2$ molecule. For Nb-M alloys, the calculated $\Delta E_{ZPE}$ ranges from 75 to 125 meV. As the effect of alloying atoms on $\Delta E_{ZPE}$ is nearly the same, zero-point energy correction is no longer necessary in the calculation of H solution energies. As is further described above, a hydrogen separation membrane manufactured comprising the alloy may have reduced hydrogen solubility. The hydrogen solubility, when measured under hydrogen pressure of about 0.1 to about 1 megaPascal (MPa) and at about 400° C., may be about 0.01 to about 0.6, more specifically about 0.05 to about 0.5. More specifically, the hydrogen solubility when measured under hydrogen pressure of about 0.7 MPa (about 7 bar) and about 400° C. may be about 0.1 to about 0.4.

A hydrogen separation membrane manufactured using the above separation membrane may have excellent hydrogen permeability. The hydrogen permeability may be calculated using Equation 2.

$$\text{Permeability}=(J \times L)/(\sqrt{P_{H_2,in}}-\sqrt{P_{H_2,out}}) \quad \text{Equation 2}$$

In Equation 1, J is flux, L is thickness of the separation membrane, $P_{H2,in}$ is input hydrogen pressure, and $P_{H2,out}$ is output hydrogen pressure.

The separation membrane may have hydrogen permeability of about $1.0 \times 10^{-8}$ to about $15.0 \times 10^{-8}$ moles per meters-second-Pascals$^{1/2}$ (mol/m*s*Pa$^{1/2}$) at about 400° C., specifically about $1.0 \times 10^{-8}$ to about $12.0 \times 10^{-8}$ mol/m*s*Pa$^{1/2}$, and more specifically about $1.5 \times 10^{-8}$ to about $10.0 \times 10^{-8}$ mol/m*s*Pa$^{1/2}$.

The separation membrane may have a thickness of about 1 to about 500 micrometers (μm), specifically about 10 to about 100 μm. When the separation membrane has a thickness in this range, it may have a flux suitable for use as a separation membrane. The thickness may be a thickness of the hydrogen separation membrane 23 of FIG. 13, or a thickness of the hydrogen separation membrane 33 tube of FIG. 14.

The separation membrane may be manufactured according to a suitable alloy manufacturing method, the details of which can be determined by one of skill in the art without undue experimentation. For example, the separation membrane may be manufactured by uniformly dissolving the Ir and the additional metal, if present, in the Group 5 element by arc melting, induction melting, or the like, and conducting a hot rolling, cold rolling, deposition, or plating process to manufacture a membrane of a desired thickness.

Figure 2:
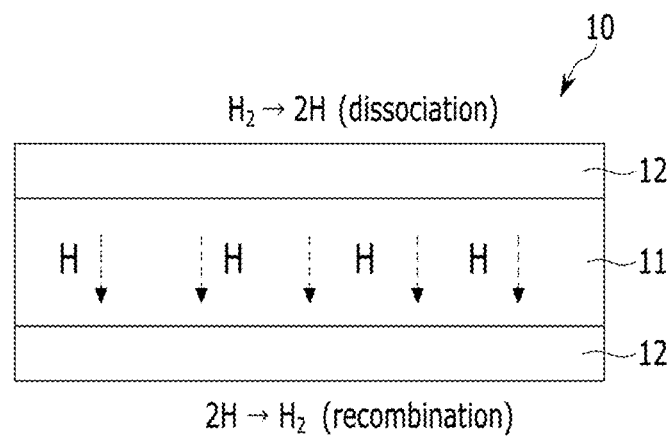
FIG. 2 is a schematic view of an embodiment of a mechanism by which hydrogen gas passes through a hydrogen separation membrane and is separated.

The hydrogen separation membrane may further comprise a catalyst layer disposed on one side or both sides of the separation membrane. FIG. 2 shows a hydrogen separation membrane 10 wherein catalyst layers 12 are disposed on both sides of the separation membrane 11, and schematically shows a mechanism by which hydrogen gas ($H_2$) passes through the hydrogen separation membrane. As is further described above, since permeation of hydrogen through the hydrogen separation membrane 10 is performed by hydrogen atoms, dissociation of hydrogen molecules ($H_2$) into hydrogen atoms (H) is desired. The catalyst layer 12 may function as a catalyst for aiding the dissociation of the hydrogen molecules. The hydrogen atoms that pass through and selectively permeate the hydrogen separation membrane 10 may be recombined to form hydrogen molecules, and the recombination may be accelerated by the catalyst layer 12.

The catalyst layer 12 may comprise a material that may function as a catalyst for the dissociation of the hydrogen molecules or recombination to hydrogen molecules on the surface of the hydrogen separation membrane 10 without limitations, and specifically, it may include Pd, Pt, Ru, Ir, Cu, Ag, Au, Rh, or a combination thereof.

The catalyst layer 12 may have a thickness of about 20 to about 1000 nanometers (nm), specifically about 50 to about 500 nm. When the catalyst layer 12 has a thickness of the above range, it may suitably function as a catalyst without substantially inhibiting permeability of the hydrogen separation membrane 10.

The hydrogen separation membrane may further comprise a barrier layer to prevent or effectively eliminate reaction and diffusion between the catalyst layer and the separation layer.

Alternatively, the hydrogen separation membrane may not comprise a catalyst layer disposed on one side or both sides of the separation membrane. Instead, the hydrogen separation membrane may comprise a separation membrane of which the surface is doped with a compound having the catalytic activity for aiding the dissociation of the hydrogen molecules. The compound having the catalytic activity for the dissociation of the hydrogen molecules may without limitations, and specifically, include Pd, Pt, Ru, Ir, Cu, Ag, Au, Rh, or a combination thereof.

The hydrogen separation membrane may be suitable for selectively permeating and separating only $H_2$ gas from a gas mixture including $H_2$, $CO_2$, CO, and the like, such as a gas produced through steam reforming, coal gasification, water gas shift reaction (WGS), and the like. For example, it may be used to provide a high purity hydrogen generating device, a hydrogen regenerator for a fuel cell, a separation membrane for separating hydrogen from a mixed gas for an integrated gasification combined cycle, a separation membrane for separating $H_2/CO_2$, or the like.

The separated hydrogen may be used for electricity generation in a clean energy source, or it may be used as a chemical feedstock (e.g., for the production of $NH_3$, olefins, or the like) or for petroleum refining. Also, since the residual gas after hydrogen removal may comprise $CO_2$ at a high concentration, the $CO_2$ rich gas may be selectively collected and stored for $CO_2$ removal.

While not wanting to be bound by theory, it is understood that the hydrogen separation membrane firstly adsorbs hydrogen gas ($H_2$), the adsorbed hydrogen gas ($H_2$) is dissociated into hydrogen atoms (H) on the surface of the hydrogen separation membrane, and the dissociated hydrogen atoms (H) permeate through the separation membrane. Through the tetrahedral or octahedral interstitial sites of a BCC (body-centered-cubic) unit cell of the separation membrane, the hydrogen atoms (H) dissolve and diffuse to provide the desired permeation as described in M. D. Dolan, J. Membrane Science, 362, 12-28, 2010, the content of which in its entirety is herein incorporated by reference. The hydrogen atoms (H) that permeate through the membrane are recombined to provide hydrogen gas ($H_2$), and then the hydrogen gas ($H_2$) is desorbed from the hydrogen separation membrane, providing the separated hydrogen gas.

According to yet another embodiment, disclosed is an apparatus comprising said hydrogen separation membrane.

According to an embodiment, the apparatus comprises:

a chamber comprising an inlet for introducing a hydrogen-containing gas, and an outlet for discharging a separated hydrogen gas; and the said hydrogen separation membrane, wherein the hydrogen separation membrane separates the chamber into a first part comprising said inlet for introducing the hydrogen-containing gas, and a second part comprising said outlet for discharging the separated hydrogen gas.

Figure 13:
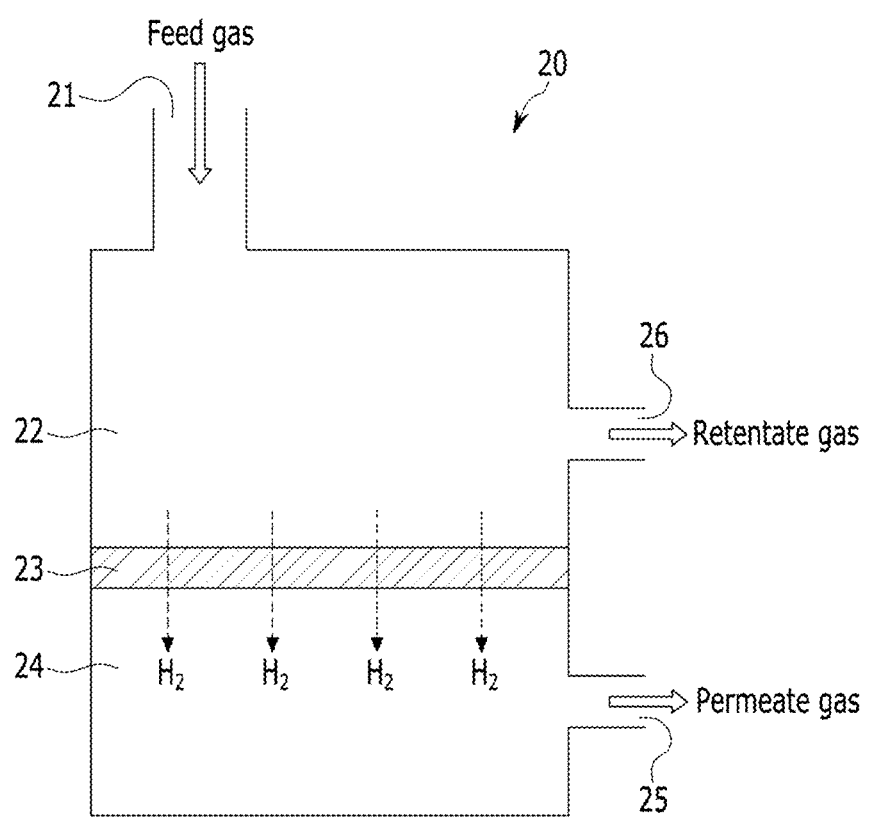
FIG. 13 is a schematic view of an embodiment of a hydrogen purifier.

FIG. 13 is a schematic view showing an embodiment of a hydrogen purifier 20. When a hydrogen-containing gas is introduced into a first part 22 of the chamber through a supply means 21 for the hydrogen-containing gas, hydrogen gas is selectively separated into a second part 23 of the chamber through the hydrogen separation membrane 23. The separated hydrogen gas may be recovered through a discharge means 25. The hydrogen purifier 20 may further include a recovery means 26 for recovering residual gas in the first part 22 of the chamber after hydrogen is separated in the chamber. The hydrogen purifier 20 is shown in a simplified form for better comprehension and ease of description, and it may further include additional components, the details of which could be determined by one of skill in the art without undue experimentation.

Figure 14:
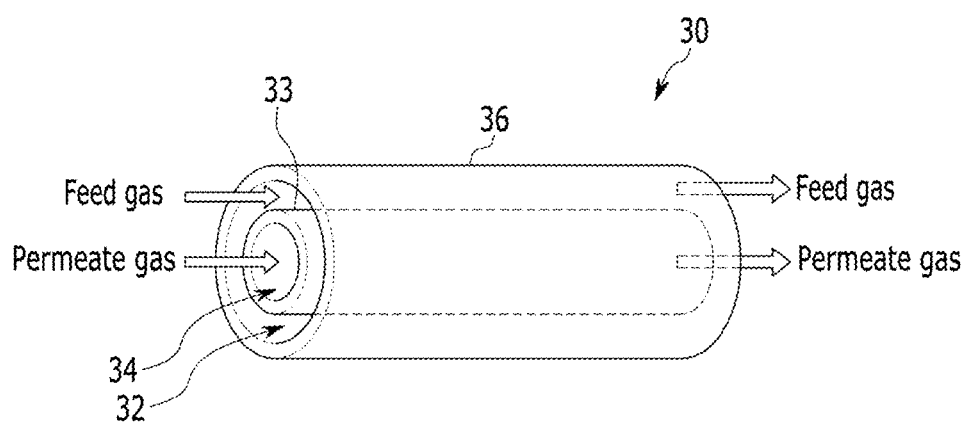
FIG. 14 is a schematic view of an embodiment of a hydrogen purifier including a tubular separation membrane.

FIG. 14 is a schematic view showing another embodiment wherein a hydrogen purifier 30 is formed in a tubular shape. The hydrogen purifier 30 includes a tubular hydrogen separation membrane 33, a cylindrical chamber wall 36 with a larger diameter than the diameter of the tubular hydrogen separation membrane and disposed outside of the hydrogen separation membrane 33, and a space between the chamber wall 36 and the hydrogen separation membrane 33, to provide a first part 32 of the chamber, while the inside of the tubular hydrogen separation membrane 33 provides a second part 34 of the chamber for discharging separated hydrogen. The first part 32 of the chamber may be further equipped with a supply means for a hydrogen-containing gas (not shown), and a recovery means for recovering a residual gas in the first part after hydrogen gas is separated (not shown). The second part 34 of the chamber may be further equipped with a discharge means for separated hydrogen gas (not shown).

According to yet another embodiment, a hydrogen purifier including the tubular hydrogen separation membrane 33 may be formed such that a hydrogen-containing gas may be supplied to the inside of the tubular hydrogen separation membrane 33, and hydrogen from the hydrogen-containing gas may pass through the tubular hydrogen separation membrane 33 to provide a separated hydrogen gas outside of the hydrogen separation membrane 33 to discharge hydrogen. This embodiment is the reverse of that shown in FIG. 14. That is, the inside of the hydrogen separation membrane 33 is where the hydrogen-containing gas is supplied, and the outside of the hydrogen separation membrane 33 is where the separated hydrogen is discharged.

Hereinafter, an embodiment is illustrated in more detail with reference to examples. However, the following are exemplary embodiments and shall not be limiting.

EXAMPLES

Example 1

Nb and Ir metal are uniformly melted by arc melting to form an alloy, thus manufacturing a hydrogen separation membrane consisting of a separation membrane with a thickness of 50 micrometers (μm). Specifically, 97 atom % of Nb and 3 atom % of Ir are weighed to prepare a mixture, Ar gas is provided under a high vacuum ($5 \times 10^{-5}$ torr or less) condition to make an oxidation-preventing condition, electrical current of the arc melter is increased to melt the mixture and provide an ingot, and then the ingot is sufficiently cooled. The ingot is processed to provide a membrane having a thickness of 50 μm, and any defect, such as a dislocation, is removed therefrom by heat-treatment under vacuum. Then Pd is coated on both sides of the membrane to manufacture a hydrogen separation membrane.

Example 2

A hydrogen separation membrane is manufactured by the same method as Example 1, except using a mixture prepared by weighing 95 atom % of Nb and 5 atom % of Ir.

Example 3

A hydrogen separation membrane is manufactured by the same method as Example 1, except using a mixture prepared by weighing 92.5 atom % of Nb and 7.5 atom % of Ir.

Example 4

A hydrogen separation membrane is manufactured by the same method as Example 1, except using a mixture prepared by weighing 90 atom % and 10 atom % of Ir.

Example 5

A hydrogen separation membrane is manufactured by the same method as Example 1, except using a mixture prepared by weighing 97.5 atom % of V and 2.5 atom % of Ir.

Example 6

A hydrogen separation membrane is manufactured by the same method as Example 1, except using a mixture prepared by weighing 95 atom % of V and 5 atom % of Ir.

Example 7

A hydrogen separation membrane is manufactured by the same method as Example 1, except using a mixture prepared by weighing 92.5 atom % of V and 7.5 atom % of Ir.

Example 8

A hydrogen separation membrane is manufactured by the same method as Example 1, except using a mixture prepared by weighing 90 atom % of V, 5 atom % of Ir, and 5 atom % of Ni.

Comparative Example 1

A hydrogen separation membrane consisting of pure Nb with a thickness of 50 μm is manufactured.

Comparative Example 2

A hydrogen separation membrane is manufactured by the same method as Example 1, except using a mixture prepared by weighing 74 atom % of Pd and 26 atom % of Ag.

Comparative Example 3

A hydrogen separation membrane is manufactured by the same method as Example 1, except using a pure Pd material to manufacture the membrane.

Comparative Example 4

A hydrogen separation membrane is manufactured by the same method as Example 1, except using a mixture prepared by weighing 95 atom % of V and 5 atom % of Ti Experimental Example 1

Evaluation of Solubility of Hydrogen

Figure 3:
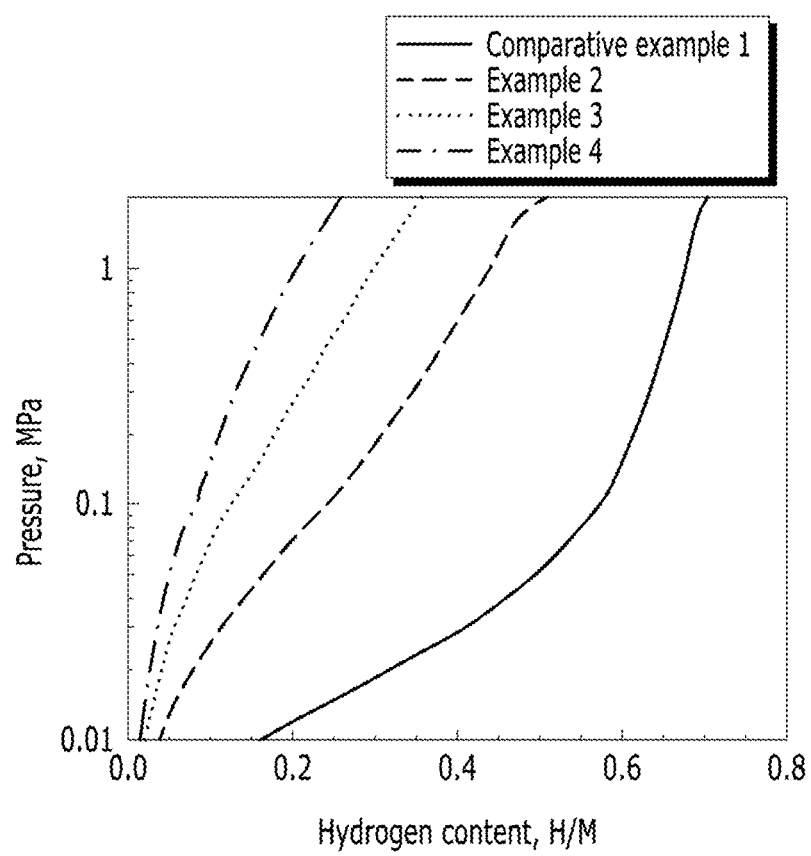
FIG. 3 is a graph of pressure (megaPascals, MPa) versus hydrogen content (moles hydrogen atoms per moles metal atoms, H/M) showing the results of pressure-concentration-temperature (PCT) evaluation of the hydrogen separation membranes manufactured in Examples 2 to 4 and Comparative Example 1.

For the hydrogen separation membranes manufactured in Examples 2 to 4 and Comparative Example 1, hydrogen solubilities are measured by using a Sievert Type PCT (pressure-concentration-temperature) instrument. The results are described in FIG. 3. Under conditions of 400° C., and 7 bar, the hydrogen solubility of the membranes manufactured in Examples 2 to 4 is lower than that of the membrane of Comparative Example 1, even though the membranes contain relatively small amounts of Ir, such as from 2.5 to 7.5 atom %. As shown in Table 1 below, the hydrogen solubility of the membrane manufactured in Example 4 is 0.25 under conditions of 400° C., and 7 bar, which is lower than the hydrogen solubility of the membrane of Comparative Example 1, which was 0.67.

Experimental Example 2

Evaluation of Stability of a Body-Centered Cubic Structure

FIG. 4 shows the results of X-ray diffraction (XRD) analysis of the composition of the hydrogen separation membranes manufactured in Example 5, Example 6, Example 7, and Example 8. The graph shows that all the compositions maintain the BCC (body-centered cubic) crystallization structure. While not wanting to be bound by theory, it is understood that if the membranes maintain BCC structure, gas permeability of the membranes may improve, because the hydrogen diffusion coefficients of the membranes are increased compared to those having the FCC (face-centered cubic) crystal structure.

Experimental Example 3

Figure 5:
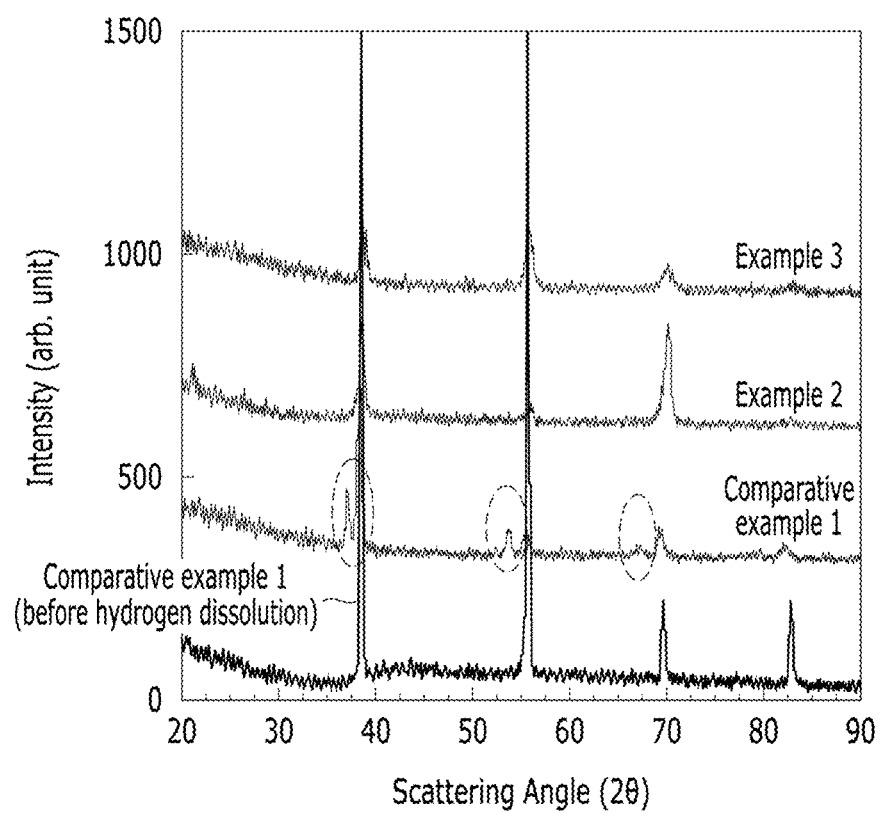
FIG. 5 is a graph of intensity (arbitrary units) versus scattering angle (degrees two-theta, $2\theta$) which shows the results of XRD analysis of the hydrogen separation membranes manufactured in Example 2, Example 3, and Comparative Example 1.

Evaluation of Stability of a Body-Centered Cubic Structure and Formation of a Metal Hydride For the hydrogen separation membrane manufactured in Example 2, Example 3, and Comparative Example 1, hydrogen pressure is applied to 10 MPa and then the membranes cooled to room temperature (about 25° C.), and X-ray diffraction analysis (XRD) is conducted to evaluate whether or not a peak corresponding to a metal hydride is produced. The results are described in Table 1. FIG. 5 shows the results of XRD analysis of the hydrogen separation membranes manufactured in Examples 2 and 3 and Comparative Example 1. The XRD analysis shows that a body-centered-cubic (BCC) structure is maintained in Examples 2 and 4. In the XRD analysis of the separation membrane of Comparative Example 1, peaks showing the formation of a metal hydride are present (circled in the XRD results of Comparative Example 1). The XRD results from before the hydrogen dissolution in the hydrogen separation membrane of Comparative Example 1 (also shown in FIG. 5) confirm that the metal hydride did not exist before the hydrogen dissolution.

For the hydrogen separation membranes manufactured in Examples 1, 2, 3, and 6, and Comparative Example 1, metal hydride formation is evaluated, and the results are described in Table 1. To examine the relationship between the solubility of hydrogen and the formation of the metal hydride, solubility of hydrogen as measured under 0.7 MPa (about 7 bar) of hydrogen pressure and 400° C. by the same method as Experimental Example 1 is described together in Table 1.

TABLE 1

| Composition | Solubility of hydrogen (H/M, wherein H is hydrogen and M is a metal) | Formation of metal hydride (room temperature) |
| --- | --- | --- |
| Example 1 | 0.55 | Small |
| Example 2 | 0.41 | Small |
| Example 3 | 0.16 | Negligible |
| Example 6 | 0.25 | Negligible |
| Comparative Example 1 | 0.67 | Present |

As provided in Table 1, the metal hydride is produced in Comparative Example 1 which has a high solubility of hydrogen, while the formation of metal hydride is small or almost negligible in Examples 1, 2, 3, and 6, which have a lower solubility of hydrogen. Thus it is confirmed that the solubility of hydrogen directly affects the formation of metal hydride.

Experimental Example 4

Evaluation of Hydrogen Embrittlement

The hydrogen separation membranes manufactured in Examples 1 to 3 and Comparative Example 1 are placed in an apparatus that is capable of hydrogen pressurization and decompression. Then, the hydrogen pressure is increased to 10 bar, 20 bar, and then 30 bar, and is then decreased to atmospheric pressure again, and the specimen is taken out to examine if cracks are generated. The results are described in Table 2 below.

TABLE 2

| | Crack |
| --- | --- |
| Example 1 | A part of a crack is produced |
| Example 2 | A little crack is produced |
| Example 3 | No crack is produced |
| Comparative Example 1 | Severe cracks are produced |

Further, change of hydrogen permeability and generation of surface cracks are examined in accordance with the increase of the pressure of hydrogen feed gas. The results are described in Table 3 below. For the membrane of Comparative Example 1 and Comparative Example 4, hydrogen permeability cannot be determined, since the membranes fracture as soon as the hydrogen pressure is applied. For the membrane of Example 6, stable hydrogen permeability is provided, regardless of increasing hydrogen pressure. This indicates that the addition of Ir element to Group 5 element improves resistance to embrittlement of the membranes.

TABLE 3

| | Hydrogen dissolution | Hydrogen permeation ($\times 10^{-8}$ mol/m * s * Pa$^{1/2}$) | | | |
| --- | --- | --- | --- | --- | --- |
| | (400° C., 7 bar) | 1 bar | 3 bar | 5 bar | 7 bar |
| Example 6 | 0.25 | 9.8 | 9.9 | 9.8 | 9.8 |
| Comparative Example 1 | 0.67 | Cracks are produced | | | |
| Comparative Example 4 | 0.72 | Cracks are produced | | | |

Experimental Example 5

Severe Cycle Evaluation

Figure 6A:
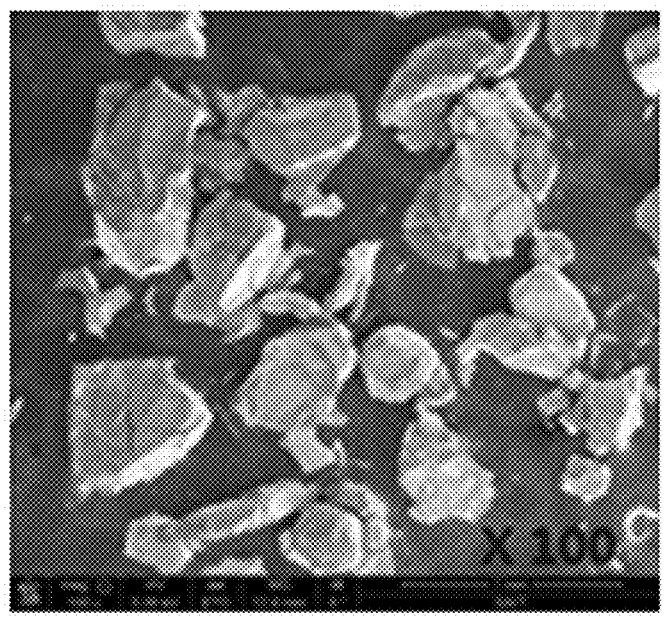
FIGS. 6A and 6B show scanning electron micrographs (SEMs) of the surface of the hydrogen separation membrane manufactured in Comparative Example 1 obtained after treatment with repeated cycles of severe conditions.
Figure 6B:
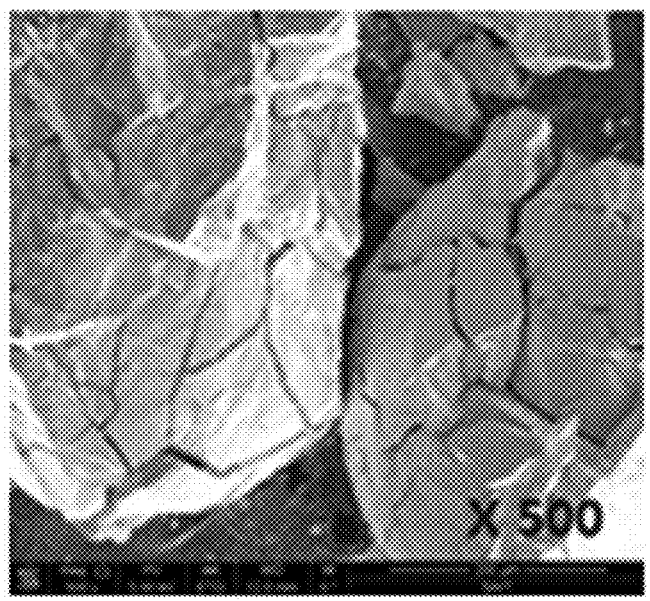
Figure 7A:
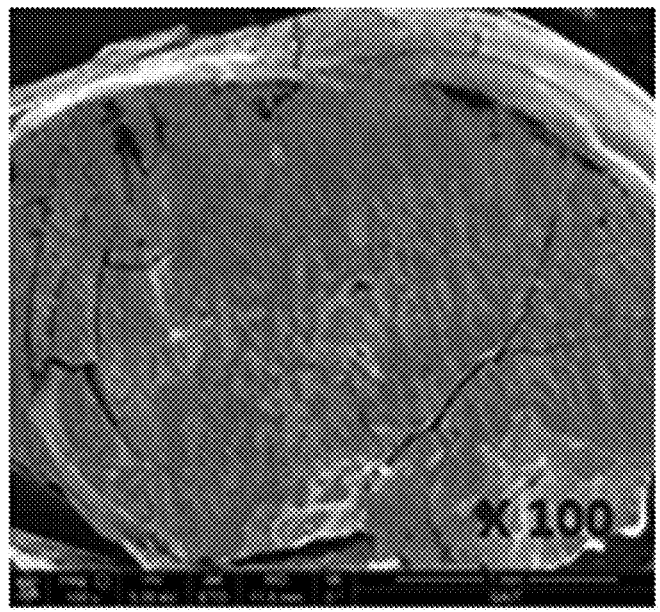
FIGS. 7A and 7B show SEMs of the surface of the hydrogen separation membrane manufactured in Example 6 obtained after treatment with repeated cycles of severe conditions.
Figure 7B:
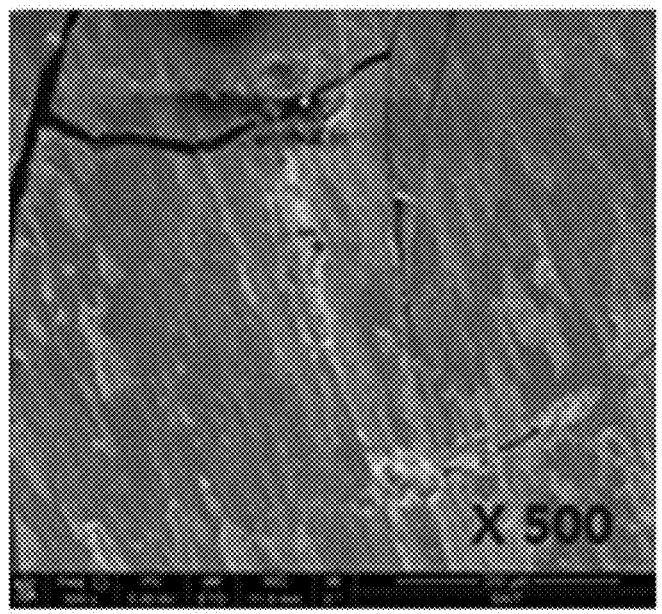

The membranes of Example 3 and Comparative Example 1 were cycled from atmospheric pressure to 50 bar hydrogen at 400° C. for 30 minutes twice. From the SEM photographs obtained after this severe cycle treatment, appearances are compared and examined. FIGS. 6A and 6B show Comparative Example 1, wherein FIG. 6A is a 100-fold magnified photograph and FIG. 6B is a 500-fold magnified photograph. Many embrittlement fractures are observed. FIGS. 7A and 7B shows Example 3, wherein FIG. 7A is a 100-fold magnified photograph and FIG. 7B is a 500-fold magnified photograph, and embrittlement fracture is slight.

Crack density is calculated by the following method, and the results are described in the Table 4. After the severe cycle treatment, an SEM photograph of the sample is taken at 100-fold magnification, and the length of the crack is measured for a 5 centimeter (cm)×5 cm cross-section. (Crack length/sample area, the fractured side is also included in the length)

TABLE 4

| | Crack density |
| --- | --- |
| Example 3 | 10 cm /25 cm$^2$ (= 0.4 cm/cm$^2$) |
| Comparative Example 1 | 80 cm /25 cm$^2$ (= 3.2 cm/cm$^2$) |

Experimental Example 6

Evaluation of Hydrogen Permeability

For the hydrogen separation membranes manufactured in Example 2, Example 6, and Comparative Example 3, the hydrogen permeability is calculated by following Equation 2, on the basis of the above results. Herein, $((P_{H2,in})^{1/2} - (P_{H2,out})^{1/2})$ is the difference between the square roots of hydrogen partial pressures of hydrogen input and output of the hydrogen separation membrane.

$$\text{Permeability} = (J \times L)/(\sqrt{P_{H_2,in}} - \sqrt{P_{H_2,out}}) \quad \text{Equation 2}$$

In the above equation, Flux (J) is a rate of hydrogen permeated per unit area, and L is a thickness of the hydrogen separation membrane.

Figure 8:
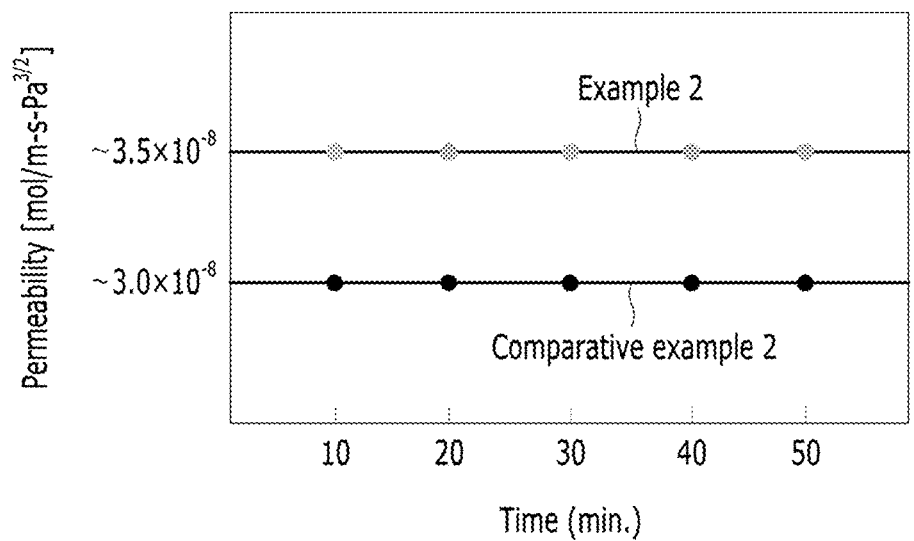
FIG. 8 is a graph of permeability (mol/m*s*$Pa^{1/2}$) versus time (minutes) which shows a measured hydrogen permeability of the hydrogen separation membranes manufactured in Example 2 and Comparative Example 2.
Figure 9:
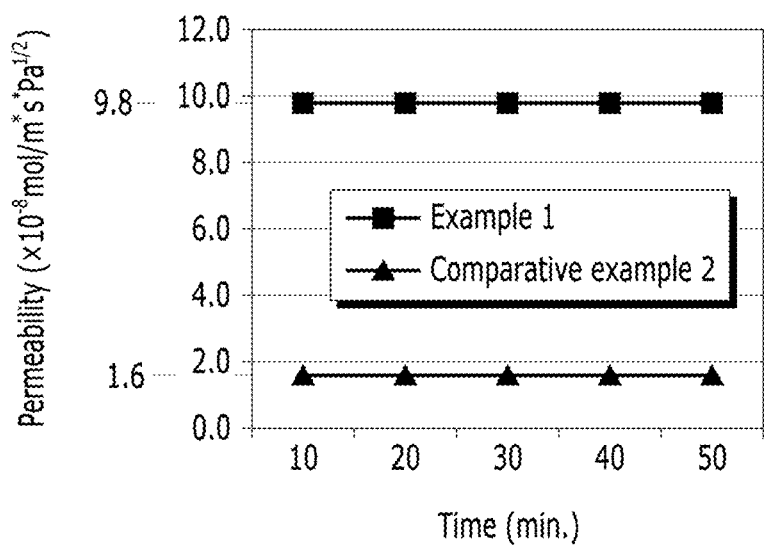
FIG. 9 is a graph of permeability (mol/m*s*$Pa^{1/2}$) versus time (minutes) which shows a measured hydrogen permeability of the hydrogen separation membranes manufactured in Example 6 and Comparative Example 3.

FIG. 8 and FIG. 9 are graphs of the hydrogen permeability calculated according to the above Equation 2. From FIG. 8, it is confirmed that Example 2 has much better hydrogen permeability than Comparative Example 2. From FIG. 9, it is confirmed that Example 6 has much better hydrogen permeability than Comparative Example 3.

The hydrogen permeability of Example 6 is $9.8 \times 10^{-8}$ mol/m*s*Pa$^{1/2}$.

The hydrogen permeability of Comparative Example 3 is $1.6 \times 10^{-8}$ mol*m*s*Pa$^{1/2}$.

Experimental Example 7

Evaluation of Oxidation Stability

Figure 10A:
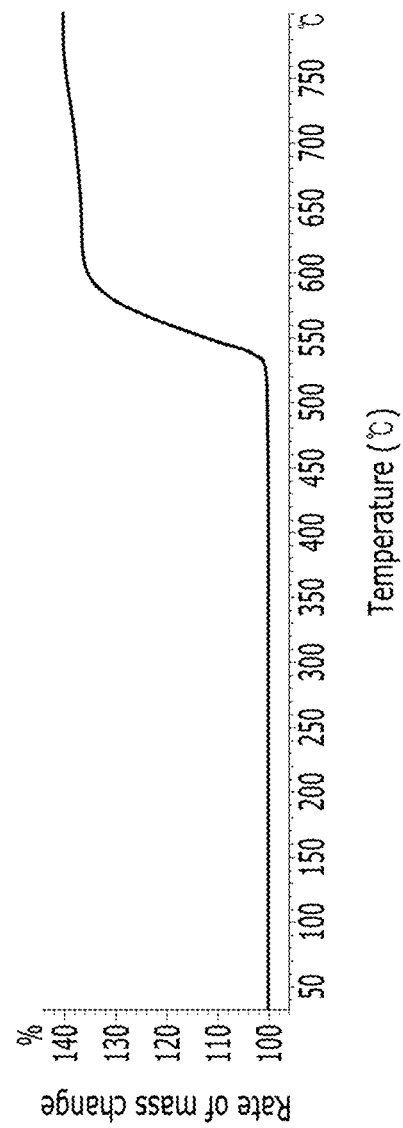
FIGS. 10A, 11A, and 12A are graphs of rate of mass change versus temperature (° C.) which show the results of thermal analysis of the hydrogen separation membranes manufactured in Example 2, Example 4, and Comparative Example 1, respectively.
Figure 10B:
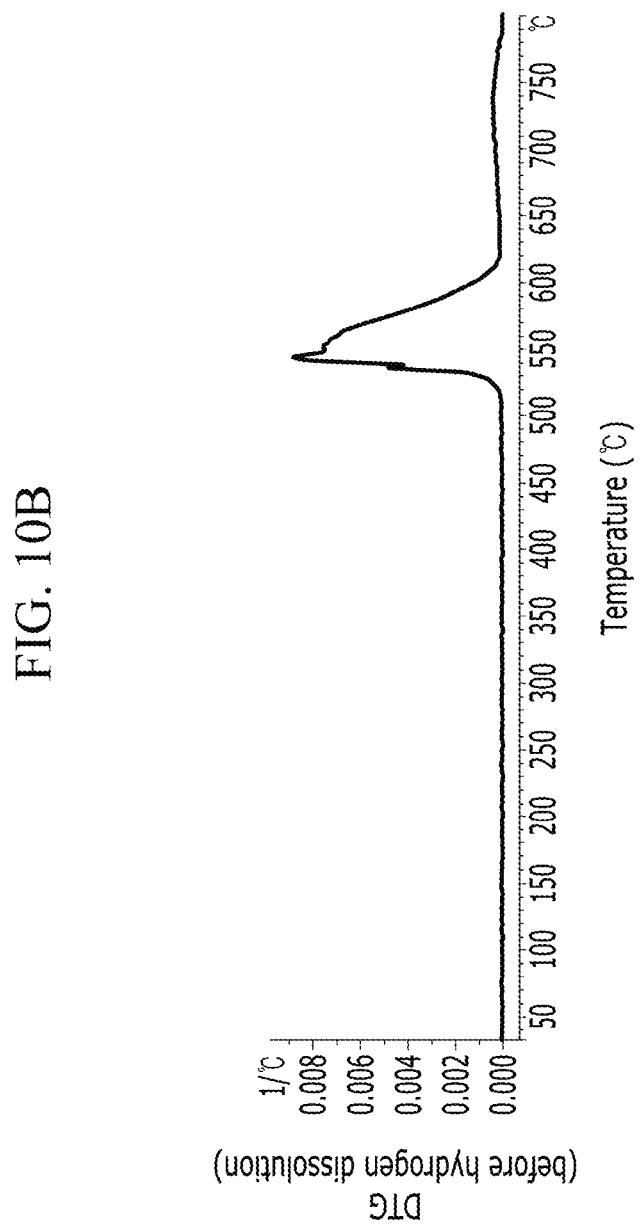
FIGS. 10B, 11B and 12B are graphs of derivative of weight versus temperature (° C.) showing the results of thermal analysis (TA) of the hydrogen separation membranes manufactured in Example 2, Example 4, and Comparative Example 1, respectively.
Figure 11A:
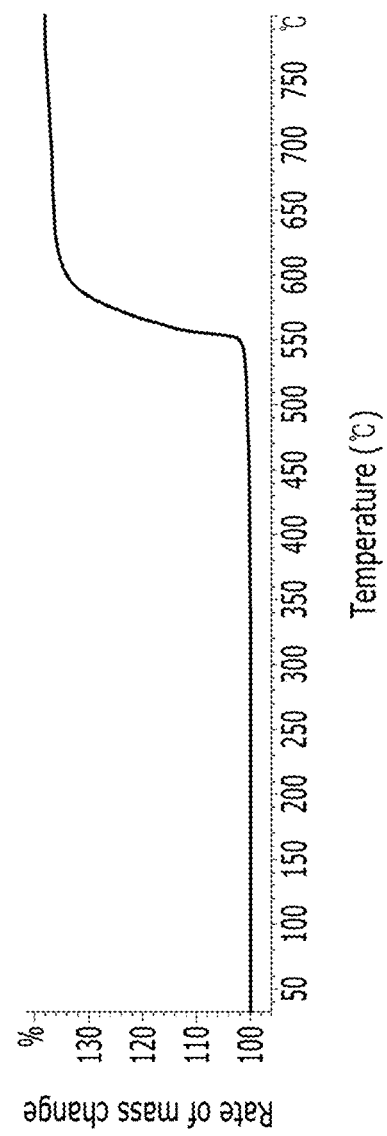
Figure 11B:
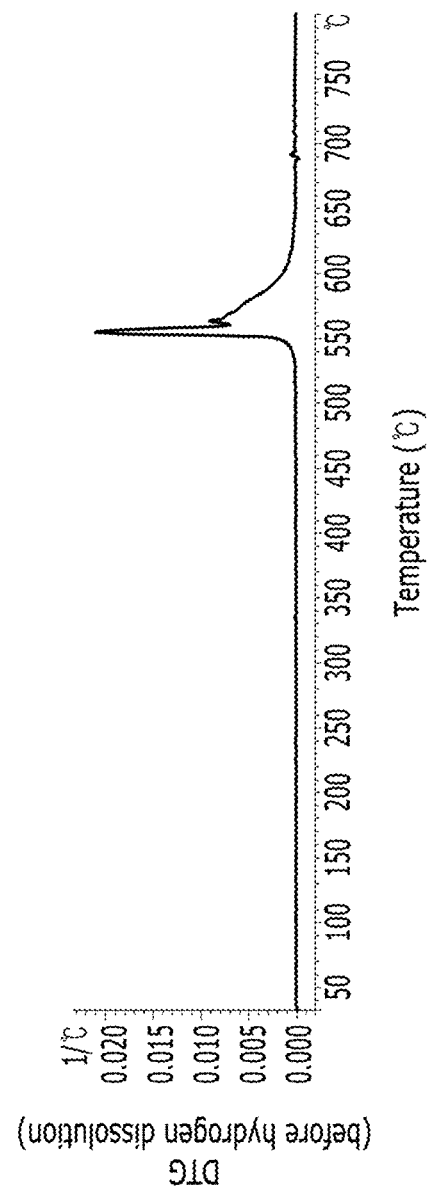
Figure 12A:
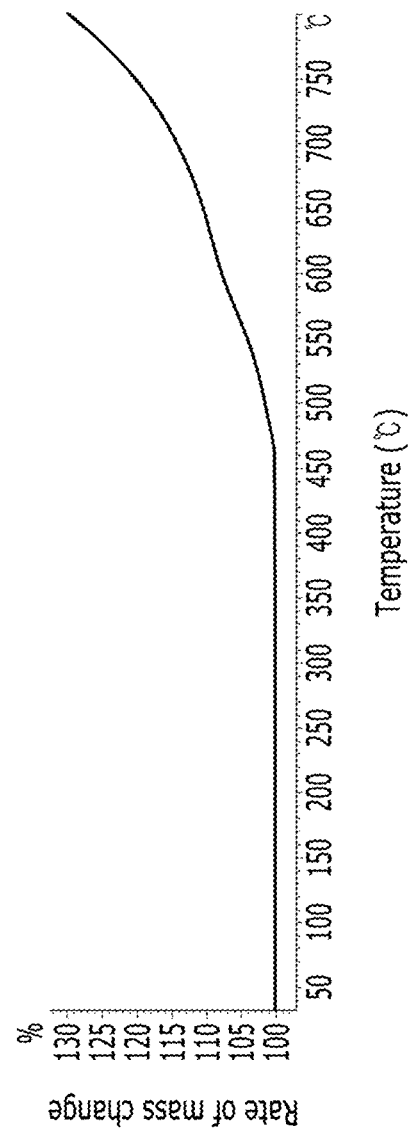
Figure 12B:
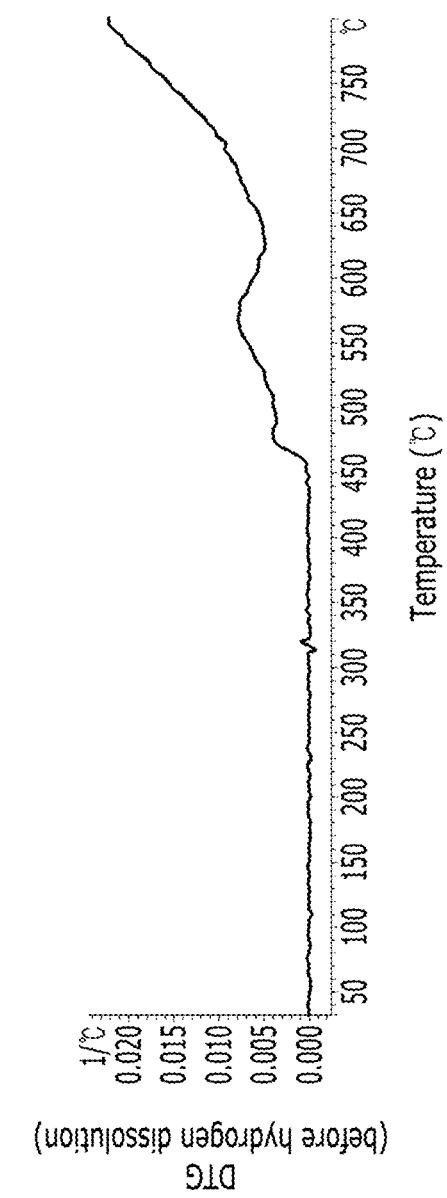

The hydrogen separation membranes manufactured in Example 2, Example 4, and Comparative Example 1 are evaluated with a thermogravimetric analyzer (TGA) while increasing the temperature from room temperature to 800° C. at a rate of 5 degrees centigrade per minute (° C./min) in an air atmosphere to observe weight change, and the results are shown in FIG. 10A to FIG. 12B. In FIGS. 10A, 11A, and 12A shows rate of mass change thermogravimetric analysis (TGA) results of Examples 2, 4, and Comparative Example 1, respectively, and FIGS. 10B, 11B, and 12B shows derivative thermogravimetry (DTG) results of Examples 2, 4, and Comparative Example 1, respectively.

From the thermogravimetric analysis, oxidation starting temperatures of the hydrogen separation membranes manufactured in Example 2, Example 4, and Comparative Example 1 are measured, and the results are described in the Table 5.

TABLE 5

|  | Oxidation starting temperature (° C.) |
|---|---|
| Example 2 | 530 |
| Example 4 | 550 |
| Comparative Example 1 | 450 |

From the results of Table 5, it is confirmed that oxidation resistance of Example 2 and Example 4 is increased, when compared to Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A separation membrane comprising
a Group 5-Ir alloy comprising a Group 5 element, wherein the Group 5 element is V, Nb, Ta, or a combination thereof, and wherein the Group 5 element is contained in the Group 5-Ir alloy in an amount equal to or greater than 60 atomic percent, based on a total content of the alloy; and
Ir, wherein the Ir is contained in the alloy in an amount of 5 to about 40 atomic percent, based on a total content of the alloy, and
wherein the alloy comprises a body centered cubic crystal structure.

2. The separation membrane of claim 1, wherein the alloy is in the form of a non-porous layer having a porosity of less than about 10 volume percent, based on a total volume of the non-porous layer.

3. The separation membrane of claim 2, wherein non-porous layer has a porosity of less than about 5 volume percent, based on a total volume of the non-porous layer.

4. The separation membrane of claim 3, wherein the non-porous layer has a porosity of less than about 1 volume percent, based on a total volume of the non-porous layer.

5. The separation membrane of claim 1, wherein the alloy is a substitutional alloy wherein the Ir is substituted for the Group 5 element in the body-centered cubic crystal structure.

6. The separation membrane of claim 1, wherein the alloy is crystalline.

7. The separation membrane of claim 1, wherein the separation membrane has a thickness of about 1 to about 500 micrometers.

8. The separation membrane according to claim 1, wherein the separation membrane is effective to separate hydrogen.

9. The separation membrane of claim 8, wherein the alloy has a hydrogen solubility of about 0.01 to about 0.6, when measured under a hydrogen pressure of about 0.1 to about 1 megaPascal and at a temperature of about 400° C.

10. The separation membrane of claim 9, wherein the alloy has a hydrogen solubility of about 0.1 to about 0.4, when measured under a hydrogen pressure of about 0.7 megaPascal and a temperature of 400° C.

11. The separation membrane of claim 8, wherein the separation membrane has a hydrogen permeability of about $1.0 \times 10^{-8}$ to about $15.0 \times 10^{-8}$ mol/m*s*Pa$^{1/2}$ at a temperature of 400° C.

12. A hydrogen separation membrane comprising:
the separation membrane of claim 1, and
a catalyst layer on the separation membrane.

13. The hydrogen separation membrane of claim 12, wherein the catalyst layer comprises Pd, Pt, Ru, Ir, Cu, Ag, Au, Rh, or a combination thereof.

14. An apparatus comprising the separation membrane of claim 1.

15. The apparatus of claim 14, further comprising:
a chamber comprising an inlet for introducing a hydrogen-containing gas into the chamber, and an outlet for discharging a separated hydrogen gas from the chamber,
wherein the separation membrane separates the chamber into a first part comprising the inlet for introducing the hydrogen-containing gas, and a second part comprising the outlet for discharging the separated hydrogen gas.

16. The separation membrane of claim 1, wherein the Ir is contained in the alloy in an amount of 5 to about 15 atomic percent.

17. The separation membrane of claim 16, wherein the Ir is contained in the alloy in an amount of 5 to about 10 atomic percent.

18. The separation membrane of claim 1, wherein the Group 5-Ir alloy further comprises an additional metal comprising Zr, Cu, Y, Ni, Al, Mn, or a combination thereof, and wherein the additional metal is contained in the alloy in an amount of about 0.1 to about 30 atomic percent, based on a total content of the alloy.

* * * * *